March 10, 1931.   F. G. CORNELL, JR   1,795,932
DEVICE FOR TREATING FOOD PRODUCTS
Filed June 8, 1927
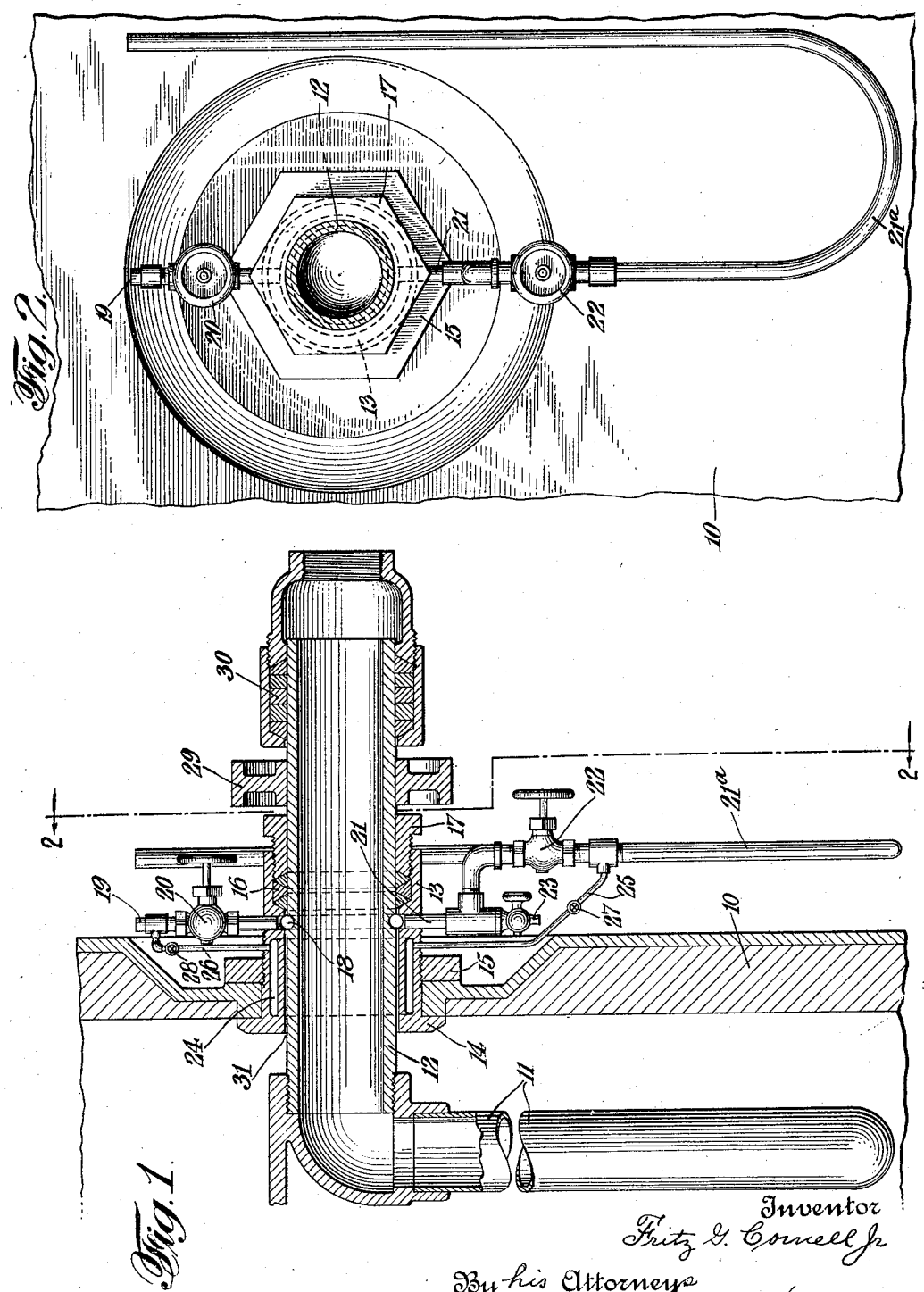
Inventor
Fritz G. Cornell Jr.
By his Attorneys
Kenyon & Kenyon Patented Mar. 10, 1931

1,795,932

UNITED STATES PATENT OFFICE

FRITZ G. CORNELL, JR., OF CALDWELL, NEW JERSEY, ASSIGNOR TO JENSEN CREAMERY MACHINERY CO., OF BLOOMFIELD, NEW JERSEY, A CORPORATION OF NEW YORK

DEVICE FOR TREATING FOOD PRODUCTS

Application filed June 8, 1927. Serial No. 197,353.

This invention relates to devices for treating dairy and other food products so as to pasteurize, heat, cool, ripen or hold such products.

Certain types of devices for treating dairy and other food products involve a container within which is provided a coil, agitator, propeller, or impeller driven by a shaft passing through the wall of the container and mounted in a stuffing box or the like arranged below the level of the fluid in the vat. The milk or other product contained in the vat may work its way between the stuffing box and the shaft where, unless it is removed, it becomes putrefied and may result in serious contamination of subsequently treated products.

An object of this invention is a liquid or semi-liquid product treating device equipped with a stuffing box from which any accumulation such as would be the case with dairy products between the stuffing box and the shaft may be readily removed and sterilization effected.

According to the present invention, means are provided for forcing a suitable medium, preferably sterile water, steam or both, between the shaft and those surfaces surrounding the shaft with which the dairy product comes in contact. By so doing any accumulation of dairy product in the stuffing box between the shaft and the surfaces surrounding the shaft with which the dairy product comes into contact may be washed out and sterilization effected. To accomplish this a space, for example, a groove, is provided either in the shaft or stuffing box surface or both with which communicates a conduit for supplying the washing or sterilizing fluid. Also the stuffing box may be equipped with a steam jacket or another heating element by means of which the stuffing box may be heated and sterilized.

Other objects, novel features and advantages of the invention will be apparent from the following specification and accompanying drawings wherein Fig. 1 is a vertical section through a device embodying the invention.

Fig. 2 is a section on the line 2–2 of Fig. 1.

10 designates any wall of a vat or container to contain the dairy product to be treated. Within the vat is arranged a coil 11 or other agitator supported for rotation. The coil or agitator is attached to one end of a shaft 12 extending through the wall 10 and by means of which the coil 11 or agitator is rotated. The shaft 12 is mounted in a stuffing box 13 which is arranged in an aperture in the wall 10 and has a head 14 which engages the inner surface of the wall. The stuffing box is clamped in position and in fluid tight relation to the wall by means of the nut 15 threaded on the stuffing box and engaging the outer face of the wall 10. Packing rings 16 surround the shaft 12 at the end of the surfaces with which the food products come into contact and are held in fluid tight contact with the shaft and body of the stuffing box by the gland 17. The gland 17 and packing rings 16 constitute the bearing for the shaft 12, the other end of the coil being supported by a corresponding shaft similarly mounted.

At the end of the surfaces surrounding the shaft with which the dairy product comes into contact adjacent the packing rings 16 there is provided in the shaft 12 or the stuffing box a suitable space, for example, a groove. As shown, a groove or grooves are provided in each of these members opposite each other to form a peripheral conduit 18 or only one groove may be provided in either member 12 or 13. A discharge pipe 19 controlled by a valve 20 communicates with the conduit 18 as does also the pipe 21 controlled by valve 22. In the pipe 21 there is provided a drain 23 and beyond the valve 22 the pipe 21 is provided with a loop or other means to form a trap 21a.

The stuffing box is provided with a peripheral chamber 24 through which steam or hot water may be circulated by means of the pipes 25 and 26 controlled by the valves 27 and 28 respectively. If desired, other means (not shown) may be provided in the stuffing box for supplying heat thereto.

A pulley 29 or other means is provided on the shaft 12 by which 12 may be rotated. The shaft 12 may be hollow to act as a conduit for supplying cooling or heating fluid or the like to the coil 11 in which case a stuffing box 30 is provided for establishing a fluid tight connection between the shaft 12 and a supply conduit.

When the level of the food product being treated is up to or above the shaft 12, the milk or other food product works its way between the shaft and the surfaces surrounding the shaft with which the food product comes into contact. The conduit 18 or other space provided collects milk or the like that may work its way along the shaft, there being around the shaft a narrow space 31 between the inside of the container and the conduit 18, as shown. Unless such accumulation is removed after treatment of a batch of milk or the like, it becomes putrefied and decomposes and may result in serious contamination of milk or the like subsequently treated in the vat. With a stuffing box embodying the present invention any accumulation in the stuffing box may be easily removed and sterilization effected. By opening the valves 20 and 22 steam or other cleansing fluid may be caused to flow or wash through the conduit 18 or other space provided, such as 31, or through cock 23, thereby washing it clean of any material that may have accumulated therein. By opening valve 20 and cock 23, the material within the stuffing box is permitted to run out through cock 23; or valve 20 may remain closed and cock 23 only opened for this purpose, or both valve 20 and cock 23 may be closed, in which case the water from 21a and steam supplied to conduit 18, or other space provided, will be forced out along with the accumulation of dairy products within the stuffing box, through the space 31 between the stuffing box and the shaft and on into the vat. Also steam may be supplied to the chamber 24 to assist in sterilization by proper regulation of the steam inlet valve 27 and exhaust cock 28. The provision of a loop or trap in the pipe 21a provides for the accumulation of sterile water for washing. Sterile water may be obtained by closing valves 22 and 27 to trap steam condensation in the loop or trap and allowing it to condense. The water thus condensed is later forced by steam or other pressure back of it into the stuffing box for washing purposes.

It is of course understood that various structural modifications may be made without in any way departing from the spirit of the invention as defined in the appended claims.

Having thus described my invention, what I claim as new and desire to secure by Letters Patent of the United States is:

1. An apparatus for treating dairy products comprising a container, a rotatable shaft extending through a wall thereof, a stuffing box for said shaft mounted in said wall, a peripheral groove in one of said members and a conduit for supplying fluid thereto, said conduit having a loop for holding a supply of flushing liquid.

2. An apparatus for treating liquid food products comprising a container, a rotatable shaft extending through a wall of said container, a stuffing box for said shaft mounted in said wall and means for forcing a suitable medium between said shaft and stuffing box to remove objectionable accumulation that may have become lodged therein, said stuffing box having provision for heating those surfaces with which the food product comes in contact.

3. An apparatus for treating dairy products comprising a container, a rotatable shaft extending through one wall thereof, a stuffing box for said shaft, and a conduit for supplying a cleansing medium between said shaft and those surfaces of said stuffing box with which the dairy product comes in contact, said conduit having means within which to hold a supply of flushing liquid.

4. An apparatus for treating food products comprising a container, a rotatable shaft extending through a wall of said container, a stuffing box for said shaft mounted in said wall, means for forcing cleansing fluid between surfaces of said shaft and stuffing box with which the food product comes in contact to remove any food product that may have accumulated therebetween, a steam jacket for said stuffing box and means for supplying steam thereto.

5. An apparatus for treating food products comprising a container, a rotatable shaft extending through a wall thereof, a stuffing box for said shaft mounted in said wall, a peripheral groove in one of said members, and a conduit for supplying fluid thereto, said stuffing box having provision for heating the surface with which the food product comes in contact.

6. An apparatus for treating food products comprising a container, a rotatable shaft extending through a wall thereof, a stuffing box for said shaft mounted in said wall, a peripheral groove in one of said members, a conduit for supplying fluid thereto, a steam chamber in said stuffing box and means for supplying steam thereto.

7. An apparatus for treating food products comprising a container, a rotatable shaft extending through one wall thereof, a stuffing box for said shaft, a groove in one of said members, and a conduit for supplying steam to said groove, said conduit being provided with means within which to trap and condense steam.

8. An apparatus for treating dairy products comprising a container, a rotatable shaft extending through one wall of said container, a stuffing box for said shaft, a steam jacket in said stuffing box, a conduit for supplying steam between the surfaces of said shaft and stuffing box, a conduit communicating therewith for supplying steam to said steam jacket and a means in said first conduit within which to trap and condense steam.

9. An apparatus for treating food products comprising a container, a rotatable shaft extending through one wall thereof, a stuffing box for said shaft, a conduit for supplying steam between said stuffing box and shaft, said conduit being provided with a loop within which to trap and condense steam.

10. An apparatus for treating dairy products comprising a container, a stuffing box mounted in one wall of said container, a rotatable shaft extending through said stuffing box, packing rings interposed between said stuffing box and shaft, a groove between said shaft and stuffing box, a conduit communicating with said groove for supplying steam thereto, and means in said conduit within which to hold a supply of flushing liquid.

11. An apparatus for treating dairy products comprising a container, a stuffing box mounted in one wall of said container, a rotatable shaft extending through said stuffing box, packing rings interposed between said stuffing box and shaft, a groove between said shaft and stuffing box, a conduit communicating with said groove for supplying steam thereto, means in said conduit within which to trap and condense steam, a steam jacket in said stuffing box and a conduit extending from said first conduit to said stuffing box for supplying steam thereto.

12. An apparatus for treating dairy products comprising a container, a stuffing box mounted in one wall of said container, a rotatable shaft extending through said stuffing box, packing rings between said stuffing box and shaft, a groove between said shaft and stuffing box, a conduit communicating with said groove for supplying steam thereto, said stuffing box having provision for heating the surfaces of the shaft and stuffing box with which the dairy product comes into contact.

13. An apparatus for treating dairy products comprising a container, a stuffing box mounted in one wall of said container, a rotatable shaft extending through said stuffing box, a conduit leading through the wall of the stuffing box and the conduit, said conduit being provided with a loop for receiving a supply of cleansing liquid.

In testimony whereof, I have signed my name to this specification.

FRITZ G. CORNELL, Jr.